(12) United States Patent
Aihara

(10) Patent No.: US 6,409,299 B1
(45) Date of Patent: Jun. 25, 2002

(54) PRINTING APPARATUS AND PRINTING METHOD

(75) Inventor: Yoshihiko Aihara, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/218,093

(22) Filed: Dec. 22, 1998

(30) Foreign Application Priority Data

Dec. 25, 1997 (JP) .............................. 9-358297
Dec. 11, 1998 (JP) ............................ 10-352451

(51) Int. Cl.⁷ .............................................. B41J 2/205
(52) U.S. Cl. ....................................................... 347/15
(58) Field of Search ............................. 347/19, 15, 12, 347/41

(56) References Cited

U.S. PATENT DOCUMENTS

| | | | |
|---|---|---|---|
| 4,313,124 A | 1/1982 | Hara | 346/140 |
| 4,345,262 A | 8/1982 | Shirato et al. | 346/140 |
| 4,459,600 A | 7/1984 | Sato et al. | 346/140 |
| 4,463,359 A | 7/1984 | Ayata et al. | 346/1.1 |
| 4,558,333 A | 12/1985 | Sugitani et al. | 346/140 |
| 4,723,129 A | 2/1988 | Endo et al. | 346/1.1 |
| 4,740,796 A | 4/1988 | Endo et al. | 346/1.1 |
| 5,946,006 A * | 8/1999 | Tajika et al. | 347/19 |
| 6,132,022 A * | 10/2000 | Akijama et al. | 347/15 |

FOREIGN PATENT DOCUMENTS

| | | |
|---|---|---|
| EP | 0578434 A | 1/1994 |
| EP | 0632405 A | 1/1995 |
| EP | 0677390 A | 10/1995 |
| EP | 0718105 A | 6/1996 |
| EP | 0718105 * | 9/1996 |
| EP | 0730367 A | 9/1996 |
| JP | 54-56847 | 5/1979 |
| JP | 59-123670 | 7/1984 |
| JP | 59-138461 | 8/1984 |
| JP | 60-71260 | 4/1985 |

* cited by examiner

Primary Examiner—John Barlow
Assistant Examiner—Ly T Tran
(74) Attorney, Agent, or Firm—Fitzpatrick, Cella, Harper & Scinto

(57) ABSTRACT

Disclosed are a printing apparatus and method through which high-quality image printing can be performed at all times even if image data is binarized so as to perform pseudo half tone representation and the binarized image is printed by multi-pass printing. The apparatus performs printing in such a manner that the periodicity of a matrix pattern such as a dither matrix for half tone representation and the periodicity of the matrix of a mask pattern, which is used in multi-pass printing, will not coincide. In a case where printing is carried out by a printhead having a plurality of ink discharge nozzles, the printing apparatus is controlled so that printing is performed by assigning a large number of different nozzles to print the same line.

19 Claims, 15 Drawing Sheets

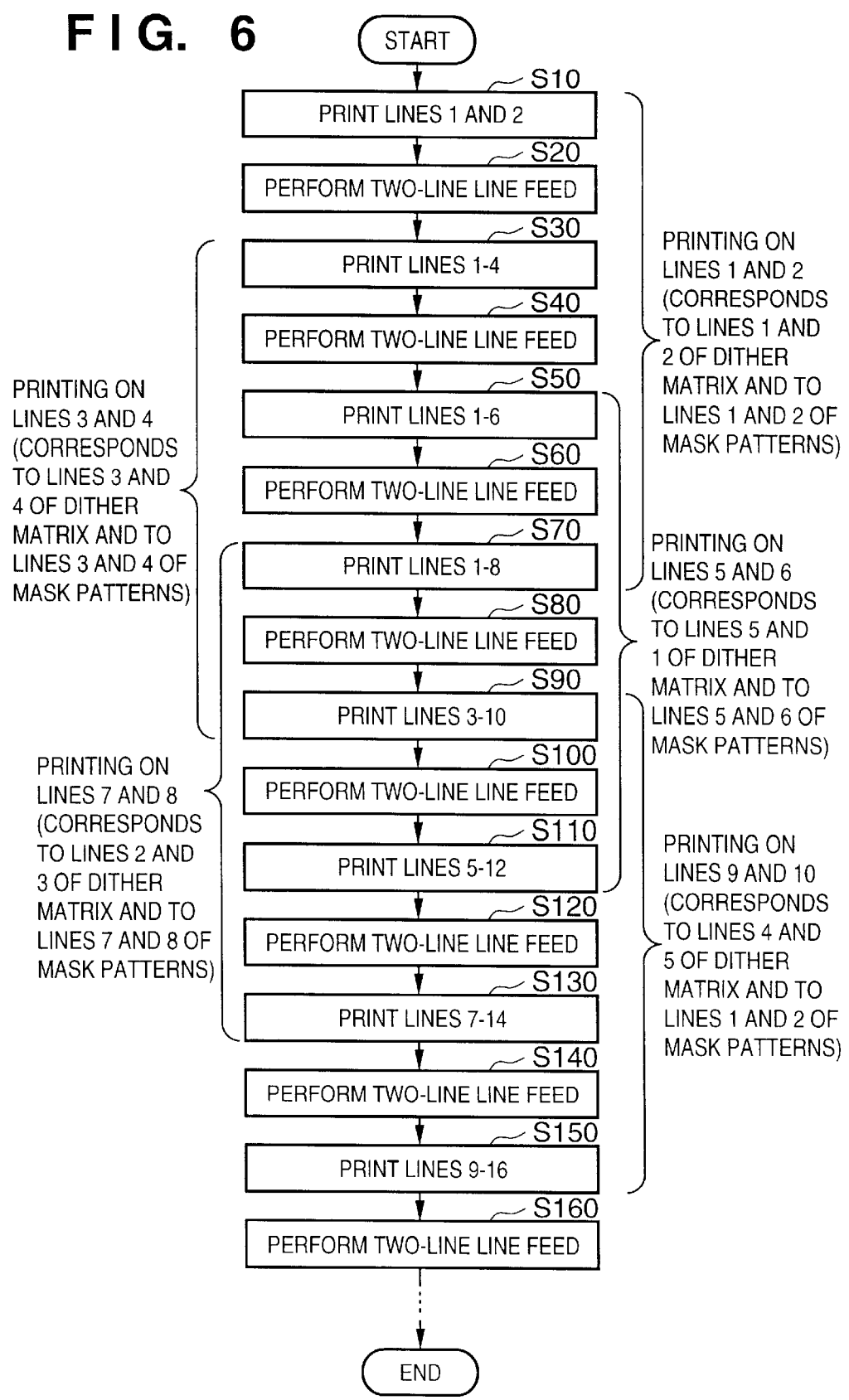

PRINTING APPARATUS AND PRINTING METHOD

BACKGROUND OF THE INVENTION

This invention relates to a printing apparatus and a printing method and, more particularly, to a printing apparatus and method for printing a binary image.

In an example of processing according to the prior art, four-pass printing is carried out while executing multi-pass print control by a printer using a printhead having eight nozzles for printing image data, which has been obtained by binarizing input multi-valued image data using a dither matrix composed of 4×4 dots, by discharging ink in accordance with the ink-jet method.

FIG. 8 is a diagram showing an example of a binarized image in which pseudo-halftone representation is achieved using a dither matrix of 4×4 dots. This example is illustrative of a case where an original image of a uniform scene has been binarized with comparatively strong highlighted density and shows a halftone image of a repeating pattern of seven black pixels in a dither matrix of 4×4 dots.

FIGS. 9A–9D are diagrams showing mask patterns when multi-pass control is carried out, particularly for four-pass printing.

In FIGS. 9A–9D, FIG. 9A illustrates a mask pattern used in a first pass, FIG. 9B a mask pattern used in a second pass, FIG. 9C a mask pattern used in a third pass and FIG. 9D a mask pattern used in a fourth pass.

Reference will now be had to FIGS. 10A–10G to describe the progress of processing in a case where the halftone image shown in FIG. 8 is printed by multi-pass (four-pass) printing by an eight-nozzle printhead using mask patterns of the kind shown in FIGS. 9A–9D.

FIGS. 10A–10G are diagrams showing the manner in which multi-pass printing proceeds. FIG. 10A shows the printing result obtained from the first pass, FIG. 10B the printing result obtained from the first and second passes, FIG. 10C the printing result obtained from the first through third passes, and FIG. 10D the printing result obtained from the first through fourth passes. It should be noted that the rectangular shape with the numerals 1 through 8 at the upper right of the drawings of FIGS. 10A through 10G represents a printhead and that each of the numerals indicates a nozzle number.

In the example of four-pass printing using the eight-nozzle printhead of the kind shown in FIGS. 10A through 10G, a line feed equivalent to two nozzles is performed per scan of the printhead and therefore the printing of the first two lines is completed by the four scans of the printhead that are shown in FIGS. 10A–10D. Similarly, two lines composed of the third and fourth lines are printed in their entirety by the four scans of the printhead that are shown in FIGS. 10B–10E; two lines composed of the fifth and sixth lines are printed in their entirety by the four scans of the printhead that are shown in FIGS. 10C–10F; and two lines composed of the seventh and eighth lines are printed in their entirety by the four scans of the printhead that are shown in FIGS. 10D–10G.

In the binary images illustrated in FIGS. 10A–10G, the portions in which numerical values are shown indicate the portions printed by the scan of the printhead at that particular time; the numerical value indicates which nozzle performed printing. The hatched portions indicate portions already printed by preceding scans of the printhead.

Thus, printing equivalent to a total of eight lines is completed by the scans of the printhead in FIGS. 10A through 10G.

FIG. 11 is a diagram illustrating which nozzles discharged the ink that formed the printed dots obtained by the above-described printing operation.

In accordance with FIG. 11, it will be understood that the printing of the first line is performed by the nozzles 1 and 7; that of the second line by the nozzle 8 alone; that of the third line by the nozzles 1 and 7; that of the fourth line by the nozzles 2 and 6; that of the fifth line by the nozzles 3 and 5; that of the sixth line by the nozzle 4 alone; that of the seventh line by the nozzles 3 and 5; and that of the eighth line by the nozzles 2 and 6.

Printing is performed over the entire print medium by subsequently repeating the eight-line printing procedure described above.

The goal of multi-pass printing will be summarized in simple terms.

With a plurality of nozzles provided on a print head, the direction of ink discharge from the nozzles and the amount of ink discharge vary from nozzle to nozzle. Consequently, even when a single horizontal line is printed by a single nozzle, the horizontal line will have a fainter color than other horizontal lines if this nozzle happens to discharge an amount of ink that is small in comparison with the amount of ink discharged by the other nozzles. Such printing results in the appearance of a faint horizontal stripe at the portion printed by the nozzle in the case of a print image obtained by discharging ink over the entire surface of a print medium or an image having a uniform density. The end result is a decline in image quality.

The goal of multi-pass printing is to avoid this situation by printing the same line using a plurality of nozzles, whereby the amount of ink discharged on the line is made uniform overall and the variation in the characteristic of a specific nozzle is rendered inconspicuous.

If such multi-pass printing is controlled in such a manner that the same line is printed by a large number of nozzles, the effects caused by a fluctuation in the amount of ink discharged from a specific nozzle will be dispersed so as not to concentrate on a specific line. The result is that the printed image can be maintained at high quality.

In the example of the prior art described above, however, it should be obvious from the printed results shown in FIG. 11 that the printing of specific lines (the second and sixth lines in FIG. 11) uses only specific nozzles (nozzles 8 and 4, respectively, in FIG. 11). This means that the original goal of multi-pass printing is not attained and that a decline in print image quality may result.

The reason for such a degradation of the image is that while the dither matrix has a 4×4 dot configuration, the size of the mask patterns used in multi-pass printing is 8×8 dots. More specifically, since the matrix of the mask patterns for multi-pass printing has a size that is a whole-number multiple of the size of the dither matrix in both the horizontal direction (the scanning direction of the printhead, also referred to as the "main-scan direction") and vertical direction (the direction in which the printing paper is conveyed, also referred to as the "sub-scan direction"), the printed pattern that is generated periodically by the dither matrix coincides with the periodicity of the nozzles selected by the mask patterns for multi-pass printing and, as a consequence, a situation arises in which in the same line is always printed by the same nozzle.

SUMMARY OF THE INVENTION

Accordingly, it is an object of the present invention to provide a printing apparatus and method in which a high-quality image can be printed at all times even in a case where image data is binarized by a binarization method for representing pseudo half tone and the binarized image is printed by multi-pass printing.

According to one aspect of the present invention, the foregoing object is attained by providing a printing apparatus for printing an image on a print medium using a pattern used for representing half tone, comprising: a printhead having a plurality of printing elements; and print control means for scanning a different printing element in the plurality of printing elements of the printhead on the same area of the print medium plural times and performing complementary printing using the pattern used for representing half tone and a mask pattern by the plural times of scans of the printhead; wherein the relationship between a period of a matrix of the pattern used for representing half tone and that of a matrix of the mask pattern is relatively prime.

It is preferred that the print control means includes thinning out means for complementarily thinning out the pattern used for representing half tone by using the mask pattern.

It is also preferred that when a size of the matrix of the pattern used for representing half tone is N1×M1, and that of the matrix of the mask pattern is N2×M2, at least one of the relationship between N1 and N2, and the relationship between M1 and M2 is relatively prime.

Further, it is preferred that not only the relationship between N1 and N2 is relatively prime, but also the relationship between M1 and M2 is relatively prime.

Furthermore, it is preferred that N1 and N2 are sizes with respect to a scanning direction of said printhead, while M1 and M2 are sizes with respect to a direction in which the print medium is conveyed.

It is preferred that the above apparatus further comprises conversion means for inputting multi-valued image data and outputting a pattern representing half tone. In this case, the conversion means outputs the pattern representing half tone by binarizing the multi-valued image data by using a dither matrix or a density pattern.

It is preferred that the above apparatus further comprises memory means for storing the pattern used for representing half tone and the matrix of the mask pattern.

It is preferred that the printhead has a plurality of ink discharge nozzles for discharging ink as the plurality of printing elements. In such case it is desirable that the printhead discharges the ink by utilizing thermal energy.

According to another aspect of the present invention, the foregoing object is attained by providing a printing method for printing an image on a print medium using a pattern used for representing half tone, comprising the steps of: scanning a different printing element in a plurality of printing elements included in a printhead on the same area of the print medium plural times; and controlling to perform complementary printing using the pattern used for representing half tone and a mask pattern by the plural times of scans of the printhead, wherein the relationship between a period of a matrix of the pattern used for representing half tone and that of a matrix of the mask pattern is relatively prime.

In accordance with the present invention as described above, printing is performed in such a manner that the periodicity of the matrix of the pattern used for representing half tone and the periodicity of the matrix of mask patterns used in multi-pass printing will not coincide. Furthermore, printing is performed by assigning a large number of different printing elements to the same line by arranging it so that a printing operation by each printing element of the printhead is dispersed over the scanning direction of the printhead.

The invention is particularly advantageous since a specific ink discharge nozzle will not happen to focus on the printing of a specific line. Even if ink is discharged from this nozzle abnormally, the abnormality will not happen to concentrate on a specific line, thereby making it possible to prevent a decline in the quality of the printed image.

Thus, the original goal of multi-pass printing can be attained and high-quality image printing can be carried out.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a flowchart illustrating multi-pass print processing;

DESCRIPTION OF THE PREFERRED EMBODIMENTS

Preferred embodiments of the present invention will now be described in detail in accordance with the accompanying drawings.

Figure 1:
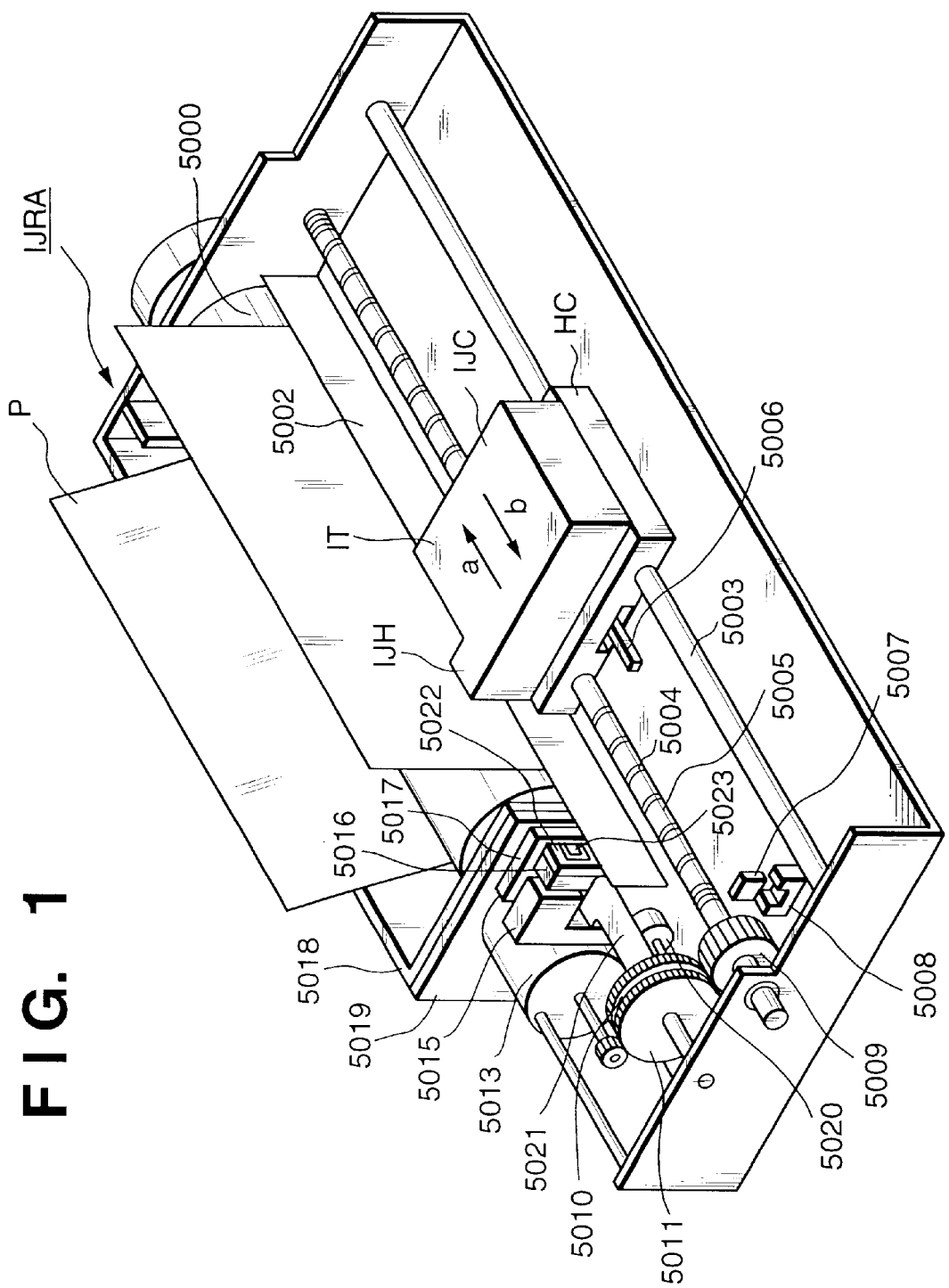
FIG. 1 is an external perspective view showing the construction of an ink-jet printer serving as a typical embodiment of the present invention.

FIG. 1 is a perspective view showing the outer appearance of an ink-jet printer IJRA as a typical embodiment of the present invention;

Brief Description of Apparatus Main Unit

FIG. 1 is a perspective view showing the outer appearance of an ink-jet printer IJRA (hereinafter referred to as "printer") as a typical embodiment of the present invention. Referring to FIG. 1, a carriage HC engages with a spiral groove 5004 of a lead screw 5005, which rotates via driving force transmission gears 5009 to 5011 upon forward/reverse rotation of a driving motor 5013. The carriage HC has a pin (not shown), and is reciprocally scanned in the directions of arrows a and b in FIG. 1. An integrated ink-jet cartridge IJC which incorporates a printing head IJH and an ink tank IT is mounted on the carriage HC. Reference numeral 5002 denotes a sheet pressing plate, which presses a paper sheet against a platen 5000, ranging from one end to the other end of the scanning path of the carriage. Reference numerals 5007 and 5008 denote photocouplers which serve as a home position detector for recognizing the presence of a lever 5006 of the carriage in a corresponding region, and used for switching, e.g., the rotating direction of the motor 5013. Reference numeral 5016 denotes a member for supporting a cap member 5022, which caps the front surface of the printing head IJH; and 5015, a suction device for sucking ink residue through the interior of the cap member. The suction device 5015 performs suction recovery of the printing head via an opening 5023 of the cap member 5015. Reference numeral 5017 denotes a cleaning blade; 5019, a member which allows the blade to be movable in the back-and-forth direction of the blade. These members are supported on a main unit support plate 5018. The shape of the blade is not limited to this, but a known cleaning blade can be used in this embodiment. Reference numeral 5021 denotes a lever for initiating a suction operation in the suction recovery operation. The lever 5021 moves upon movement of a cam 5020, which engages with the carriage, and receives a driving force from the driving motor via a known transmission mechanism such as clutch switching.

The capping, cleaning, and suction recovery operations are performed at their corresponding positions upon operation of the lead screw 5005 when the carriage reaches the home-position side region. However, the present invention is not limited to this arrangement as long as desired operations are performed at known timings.

Figure 2:
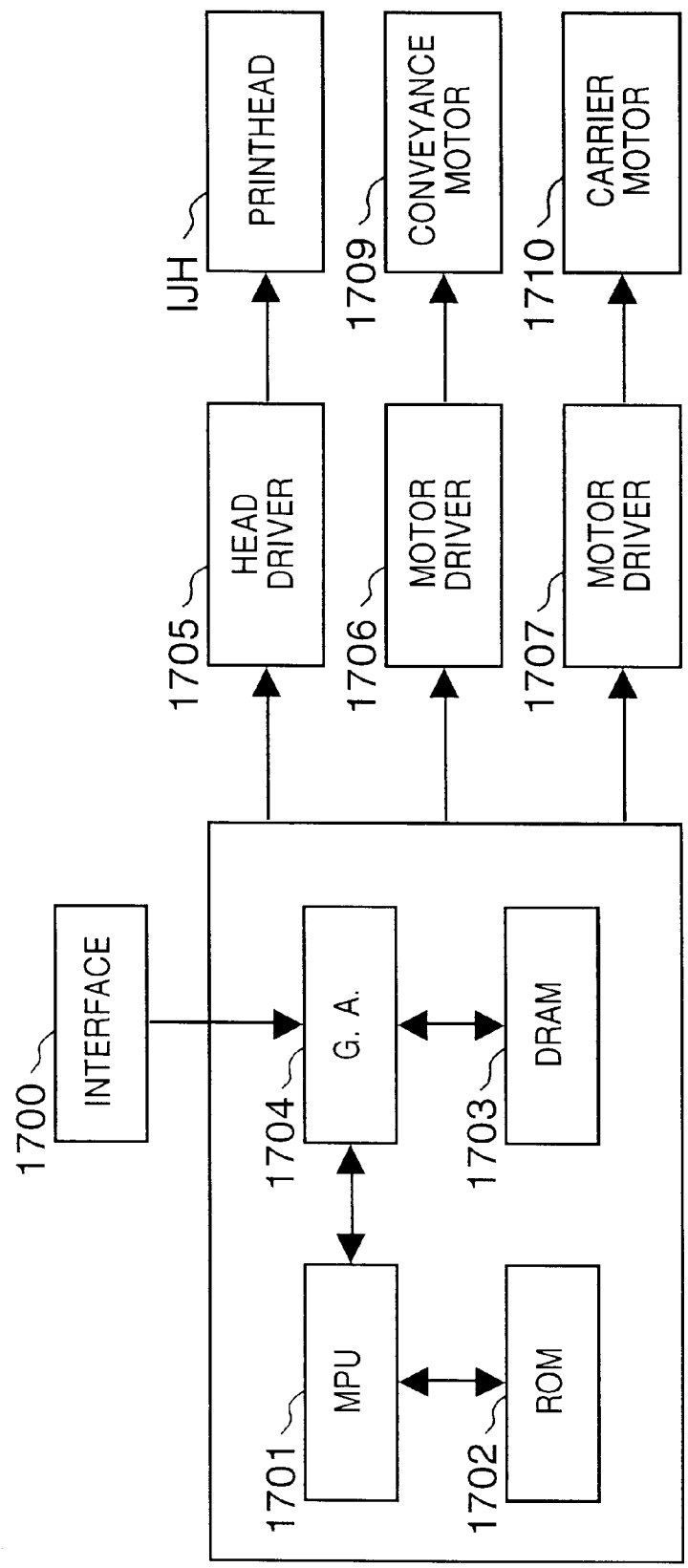
FIG. 2 is a block diagram showing the construction of a control circuit for controlling the ink-jet printer.

FIG. 2 is a block diagram showing the arrangement of a control circuit of the printer. Referring to FIG. 2 showing the control circuit, reference numeral 1700 denotes an interface for inputting a printing signal from an external unit such as a host computer; 1701, an MPU; 1702, a ROM for storing a control program (including character fonts if necessary) executed by the MPU 1701; and 1703, a DRAM for storing various data (the printing signal, printing data supplied to the printing head, and the like). Reference numeral 1704 denotes a gate array (G.A.) for performing supply control of printing data to the printing head IJH. The gate array 1704 also performs data transfer control among the interface 1700, the MPU 1701, and the RAM 1703. Reference numeral 1710 denotes a carrier motor for transferring the printing head IJH in the main scanning direction; and 1709, a conveyance motor for conveying a printing sheet. Reference numeral 1705 denotes a head driver for driving a head; and 1706 and 1707, motor drivers for driving the conveyance motor 1709 and the carrier motor 1710.

The operation of the above control arrangement will be described below. When a printing signal is input to the interface 1700, the printing signal is converted into printing data for a printing operation between the gate array 1704 and the MPU 1701. The motor drivers 1706 and 1707 are driven, and the printhead IJH is driven in accordance with the printing data supplied to the head driver 1705, thus performing the printing operation.

It should be noted that the printer IJRA in this embodiment receives an input of multi-valued image data from a host, converts this multi-valued image data to binary data using a dither matrix and prints the image represented by the binary data by multi-pass printing. In order to accomplish this, the dither matrix and mask patterns for multi-pass printing are stored in the ROM 1701. According to this embodiment, the arrangement is such that four-pass printing can be carried out by having the printhead IJH print on the same area of the print medium a maximum of four times to complete the printing of the image in this area.

Alternatively, it is possible to adopt an arrangement in which the multi-valued image data is converted to binary image data by the host through a dither method, the binary image data is transmitted from the host and received by the interface 1700 and multi-pass printing is performed using the received binary image data as is. In this case, however, it is assumed that the printer IJRA knows the size of the dither matrix used by the host.

According to this embodiment, the size of the dither matrix is assumed to be 4×5 dots (four dots in the main-scan direction, namely the direction in which the printhead IJH moves)×(five dots in the sub-scan direction, namely the direction in which the printing paper is conveyed). Furthermore, in order to simplify the description given below, it is assumed that eight is the number of ink discharge nozzles (referred to simply as "nozzles" below) with which the printhead IJH is equipped. The nozzles are arrayed orthogonal to the moving direction of the printhead IJH, i.e., parallel to the direction in which the printing paper is conveyed.

Figure 3:
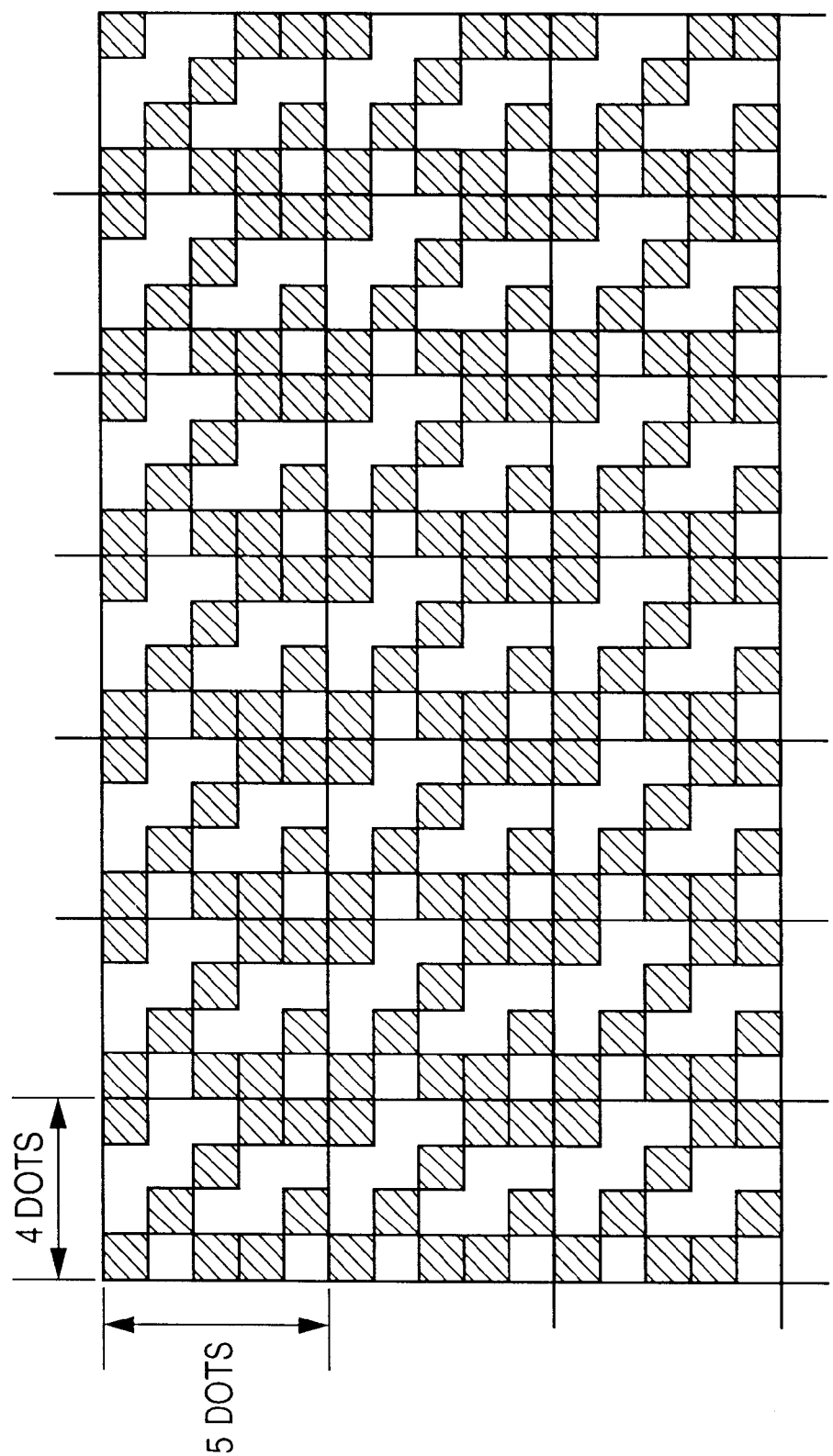
FIG. 3 is a diagram illustrating an example of a binarized image in which pseudo-halftone representation is achieved using a dither matrix of 4×5 dots.
Figure 8:
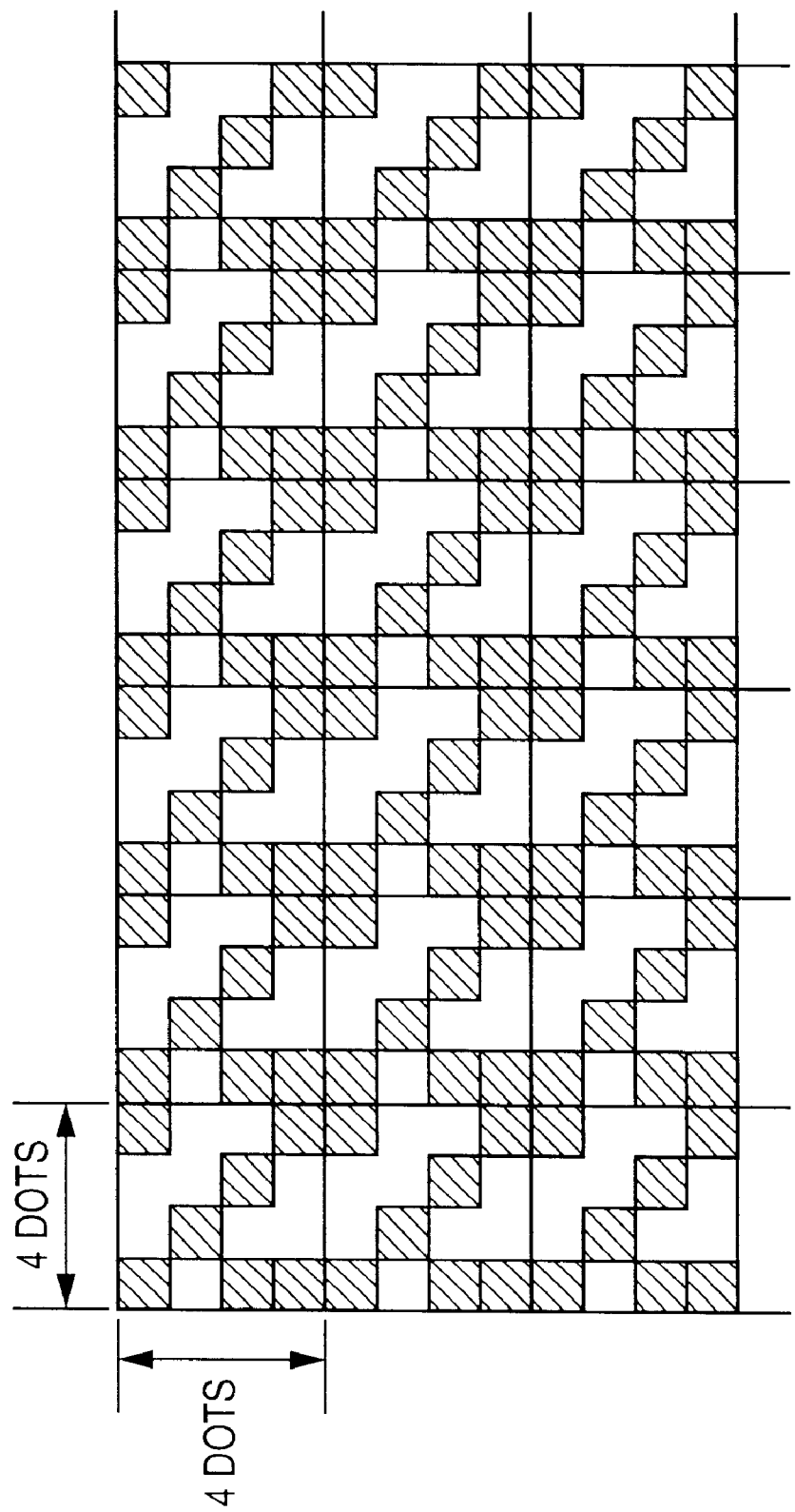
FIG. 8 is a diagram illustrating an example of a binarized image in which pseudo-halftone representation is achieved using a dither matrix of 4×4 dots.
Figure 9A:
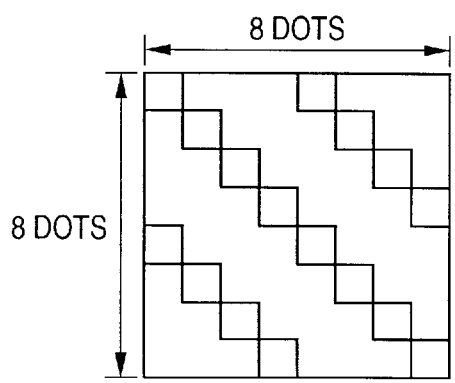
FIGS. 9A, 9B, 9C and 9D are diagrams showing mask patterns when multi-pass print control is carried out and four-pass printing, in particular, is performed according to the prior art.
Figure 9B:
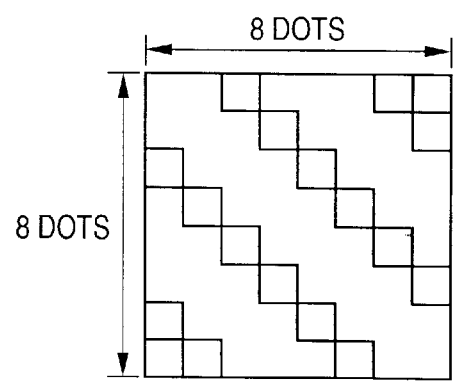
Figure 9C:
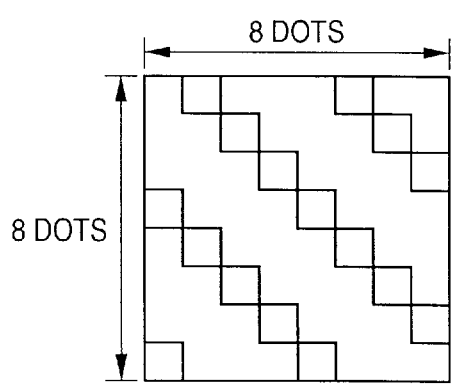
Figure 9D:
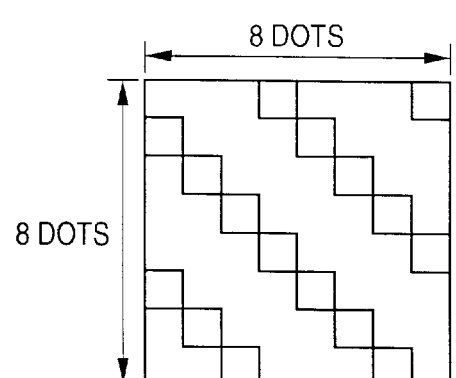
Figure 10A:
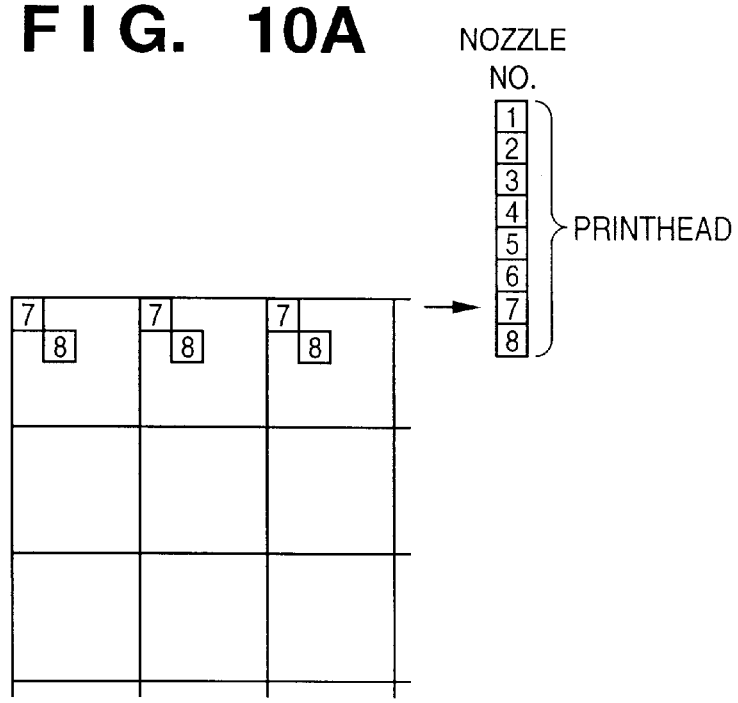
FIGS. 10A, 10B, 10C, 10D, 10E, 10F and 10G are diagrams showing the manner in which multi-pass printing proceeds according to the prior art.
Figure 10B:
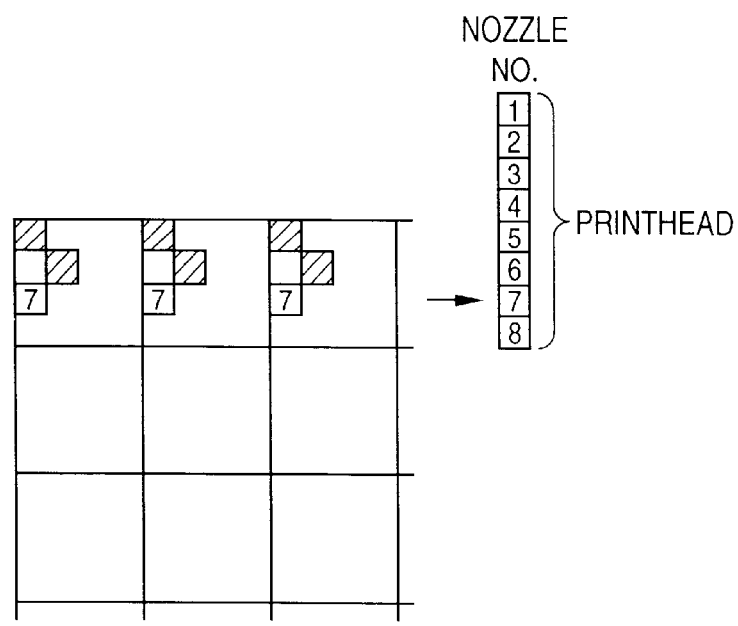
Figure 10C:
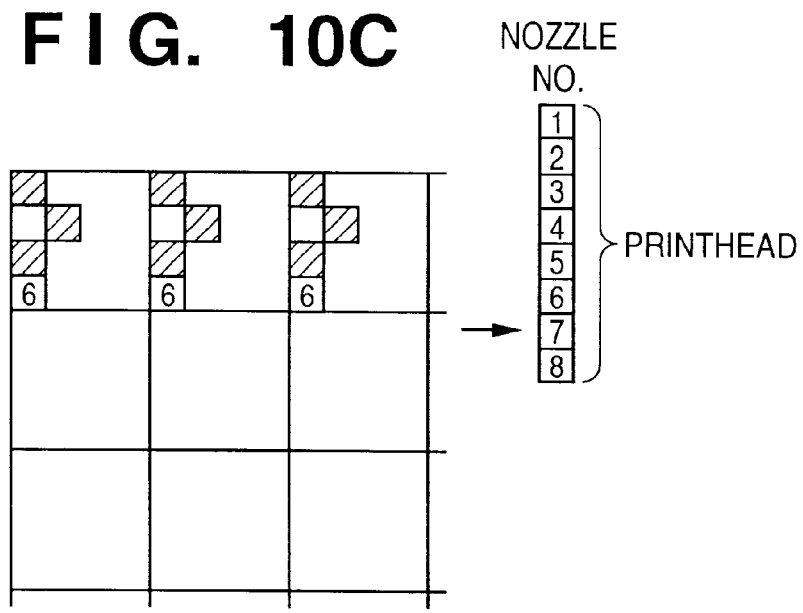
Figure 10D:
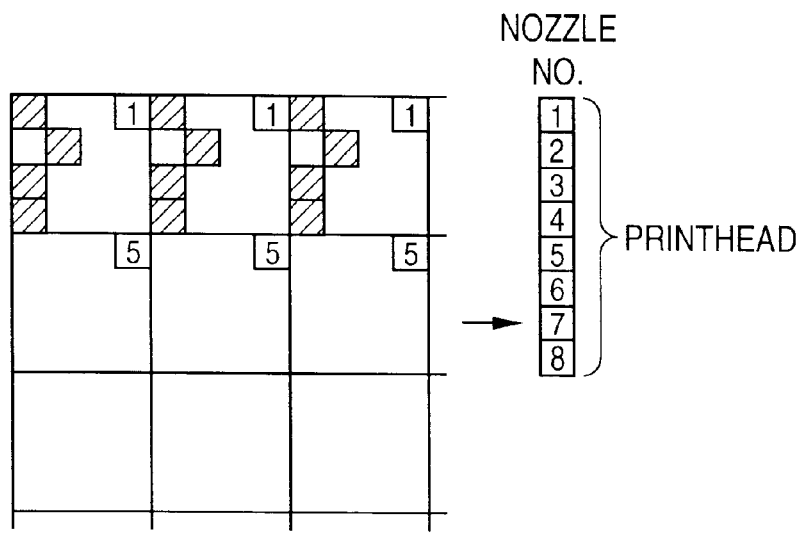
Figure 10E:
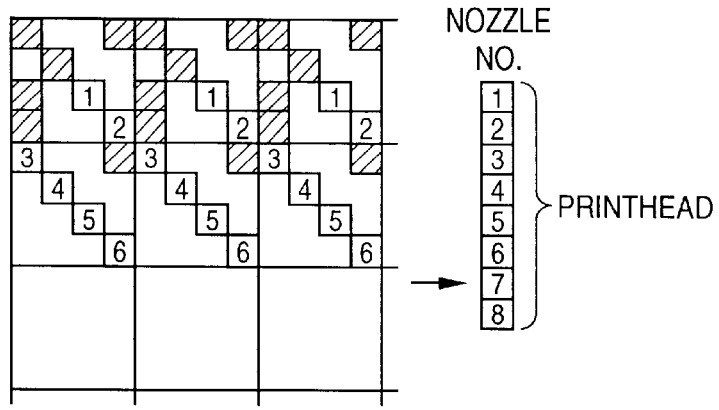
Figure 10F:
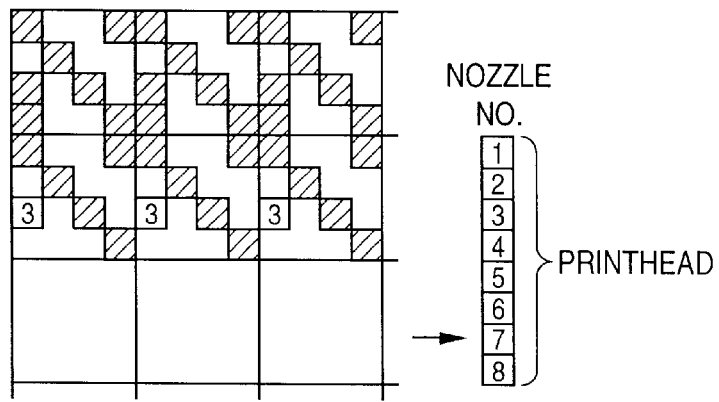
Figure 10G:
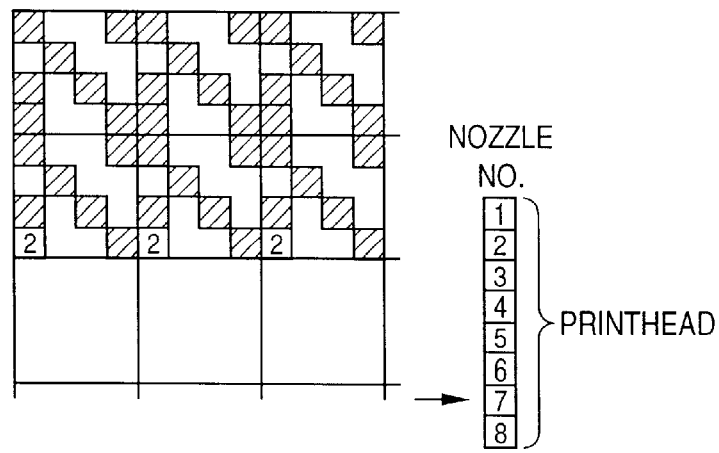
Figure 11:
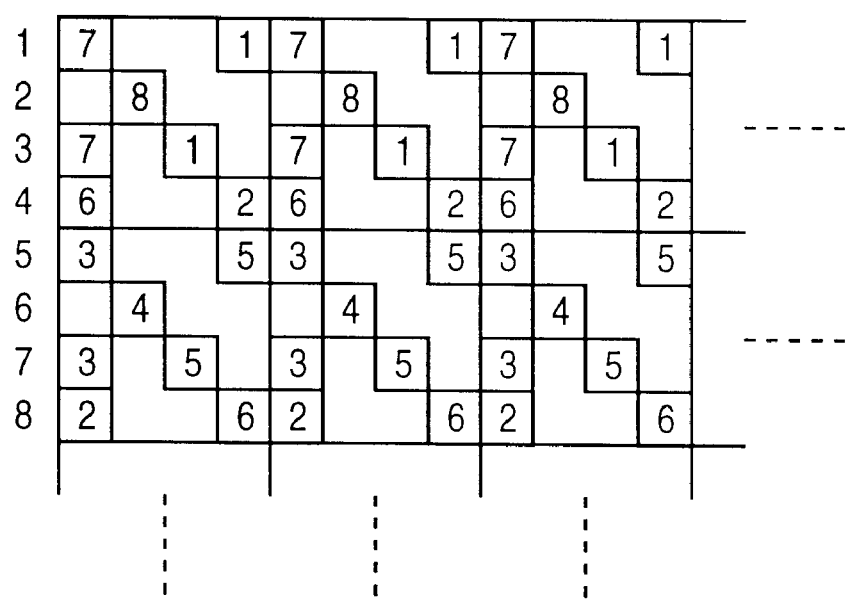
FIG. 11 is a diagram illustrating which nozzles of a printhead discharged ink that formed printed dots obtained by a multi-pass printing operation according to the prior art.

FIG. 3 is a diagram illustrating an example of a binarized image in which pseudo-halftone representation is achieved using a dither matrix of 4×5 dots. The binarized image shown in FIG. 3 is illustrative of a case where an original image of a uniform scene has been binarized with comparatively strong highlighted density in a manner substantially the same as that shown in FIG. 8 in accordance with the prior art. This example is a halftone image of a repeating pattern of nine black pixels in a dither matrix of 4×5 dots.

FIGS. 4A–4D are diagrams showing matrices of mask patterns when multi-pass print control is carried out, particularly for four-pass printing. The size of each matrix is 9×8 dots (nine dots in the main-scan direction, namely the direction in which the printhead IJH moves)×(eight dots in the sub-scan direction, namely the direction in which the printing paper is conveyed).

Figure 4A:
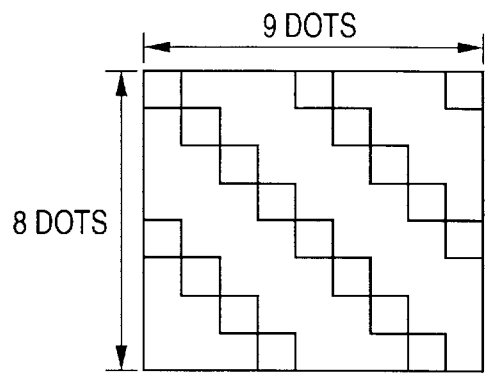
FIGS. 4A–4D are diagrams showing mask patterns when multi-pass print control is carried out, particularly for four-pass printing.
Figure 4B:
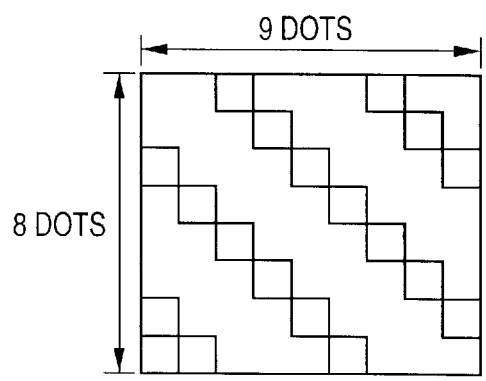
Figure 4C:
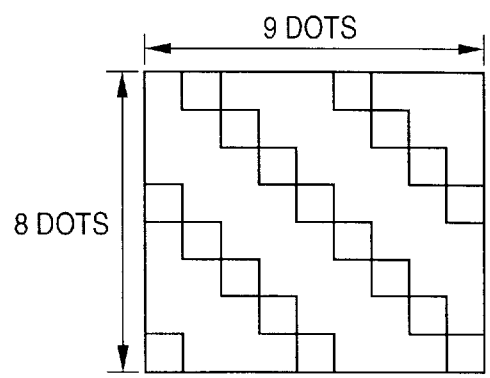
Figure 4D:
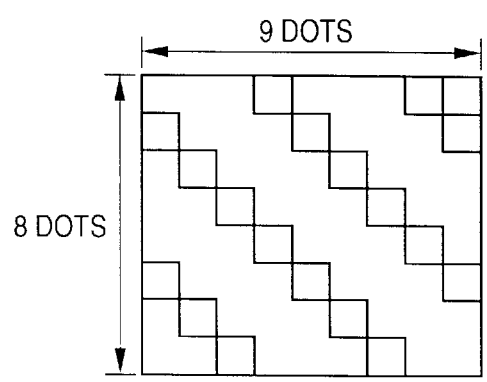

In FIGS. 4A–4D, FIG. 4A illustrates a mask pattern used in a first pass, FIG. 4B a mask pattern used in a second pass, FIG. 4C a mask pattern used in a third pass and FIG. 4D a mask pattern used in a fourth pass.

Figure 7:
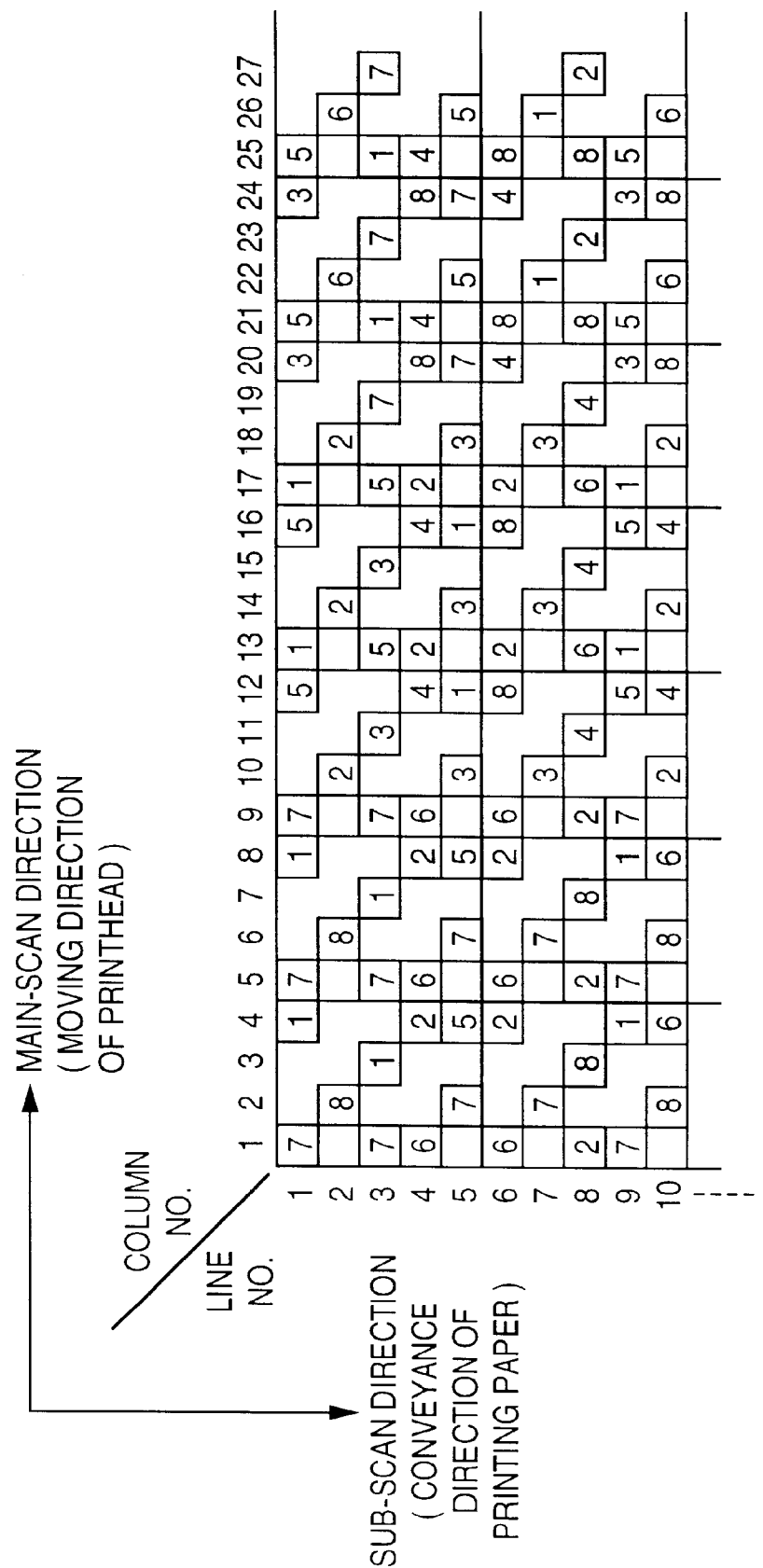
FIG. 7 is a diagram showing the result of printing a binarized image printed in accordance with an embodiment of the present invention.

Reference will now be had to FIGS. 5 through 7 to describe processing in a case where the halftone image shown in FIG. 3 is printed by multi-pass (four-pass) printing by the eight-nozzle printhead using mask patterns of the kind shown in FIGS. 4A–4D.

FIGS. 5A–5G are diagrams showing the manner in which multi-pass printing proceeds, and FIG. 6 is a flowchart illustrating multi-pass print processing.

Figure 5A:
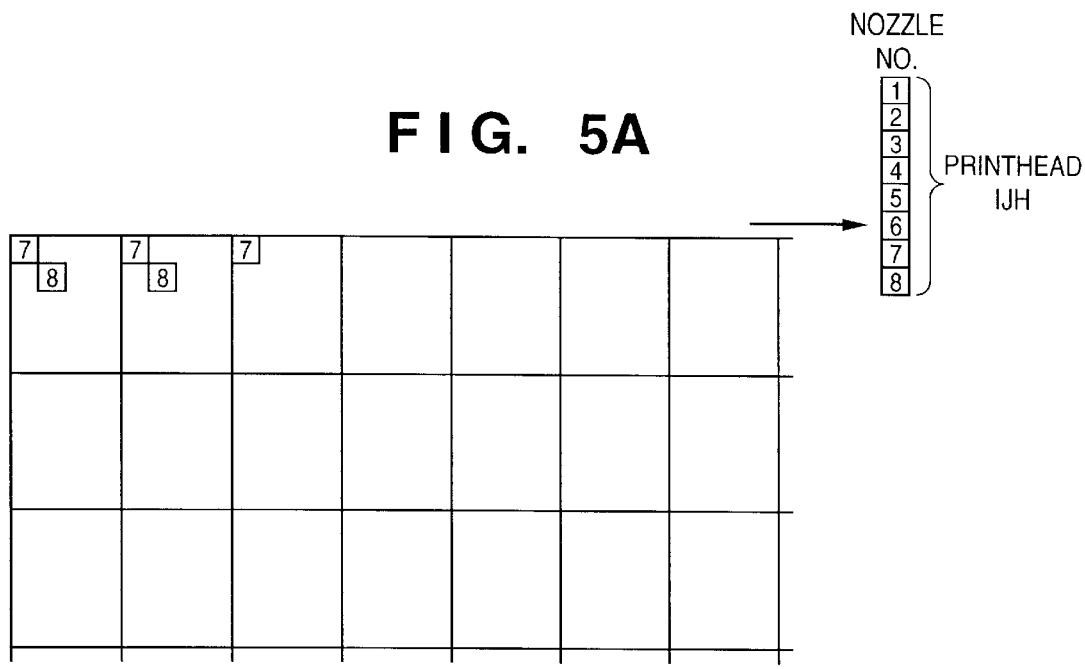
FIGS. 5A–5G are diagrams showing the manner in which multi-pass printing proceeds.
Figure 5B:
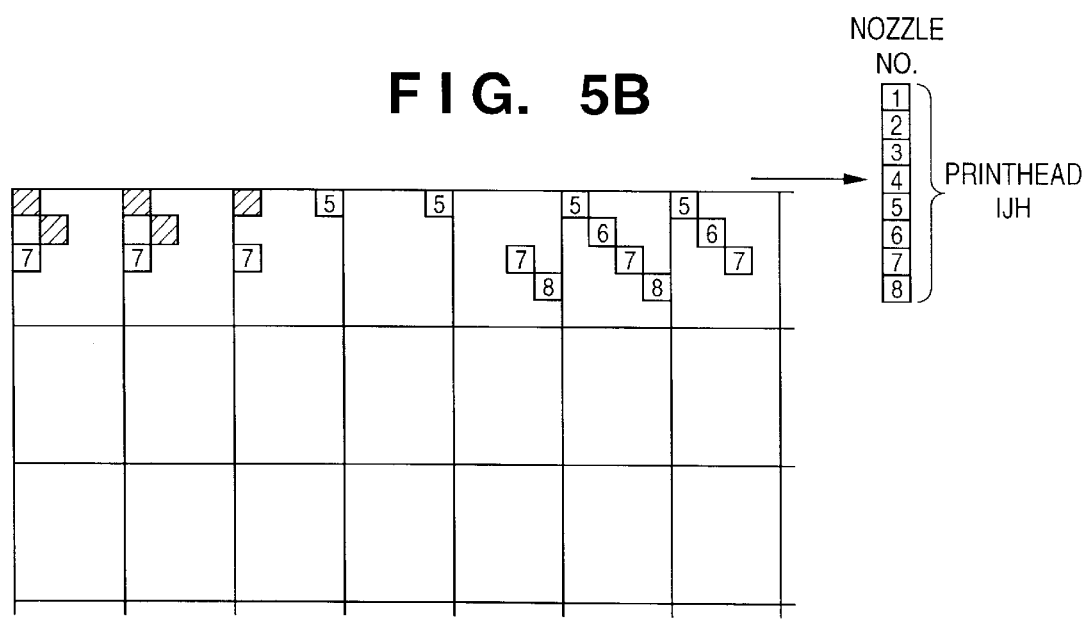
Figure 5C:
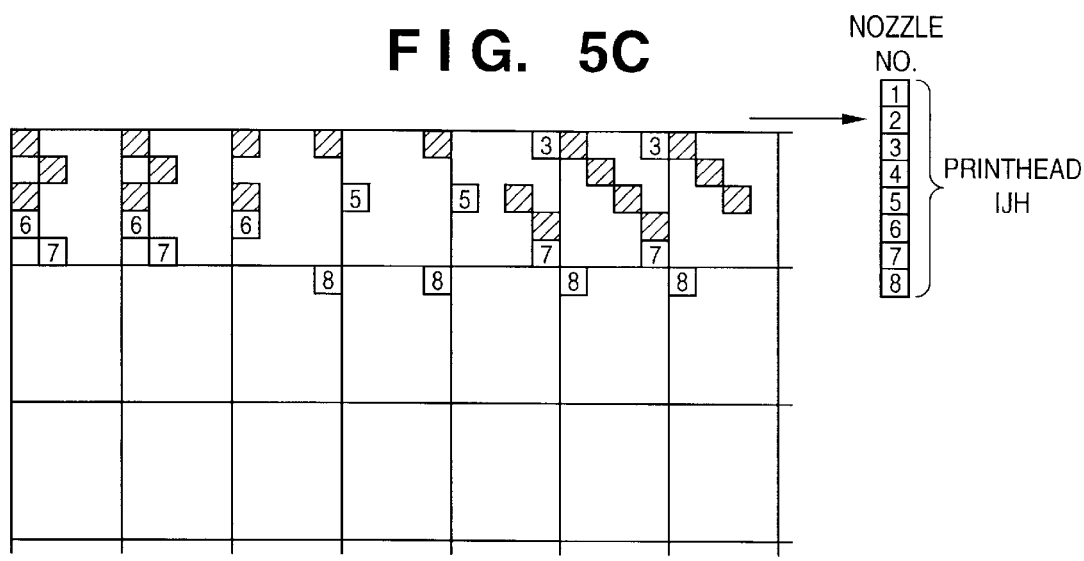
Figure 5D:
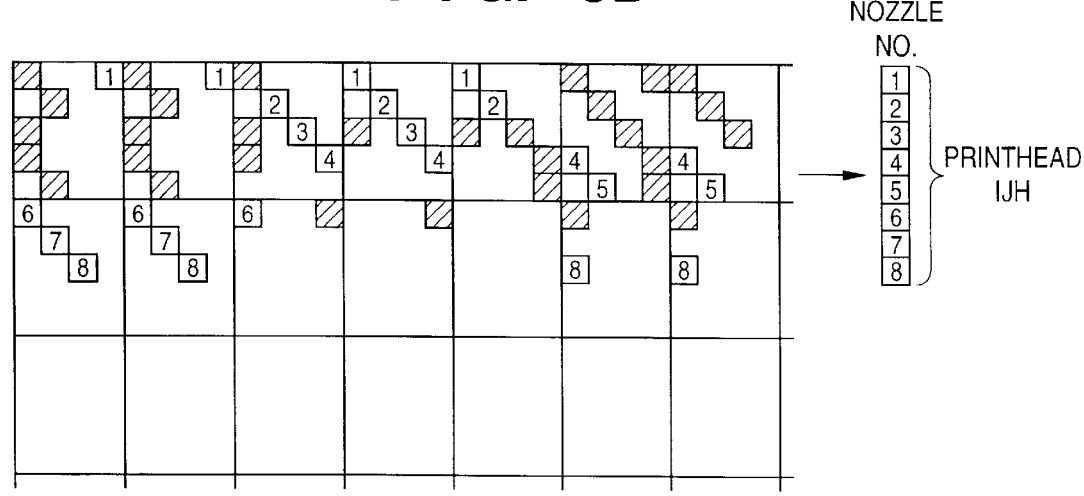

FIG. 5A shows the printing result obtained from the first pass, FIG. 5B the printing result obtained from the first and second passes, FIG. 5C the printing result obtained from the first through third passes, and FIG. 5D the printing result obtained from the first through fourth passes. The rectangular shape with the numerals 1 through 8 at the upper right of the drawings of FIGS. 5A through 5G represents the printhead IJH and each of the numerals indicates a nozzle number.

In the binary images illustrated in FIGS. 5A–5G, the portions in which numerical values are shown indicate the portions printed by the scan of the printhead IJH at that particular time; the numerical value indicates which nozzle performed printing. The hatched portions indicate portions already printed by preceding scans of the printhead. This is similar to the case FIGS. 10A–10G described above in the description of the prior art.

In the example of four-pass printing using the eight-nozzle printhead IJH in the manner shown in FIGS. 5A through 5G, a line feed of two nozzles is performed per scan of the printhead IJH, in a manner similar to that of the prior art. At step S10 in FIG. 6, therefore, lines 1 and 2 are printed using nozzles 7, 8 of the printhead, as shown in FIG. 5A, by the initial scan of the printhead. Next, at step S20, the printing paper is subjected to a line feed equivalent to two nozzles, i.e., two lines, then, at step S30, lines 1 to 4 are printed using nozzles 5–8 of the printhead, as shown in FIG. 5B, by the second scan of the printhead.

Next, at step S40, the printing paper is subjected to a line feed of two lines, then, at step S50, lines 1 to 6 are printed using nozzles 3–8 of the printhead, as shown in FIG. 5C, by the third scan of the printhead. This is followed by step S60, at which the printing paper is subjected to a line feed of two lines, then by step S70, at which lines 1 to 8 are printed using nozzles 1–8 of the printhead, as shown in FIG. 5D, by the fourth scan of the printhead.

Thus, the printing (four-pass printing) of the first two lines is completed by four scans of the printhead. The first two lines of the dither matrix of 4×5 dots and the first two lines of the matrix of the mask patterns of 9×8 dots are used in the printing of the area in which printing of the image is thus completed.

Figure 5E:
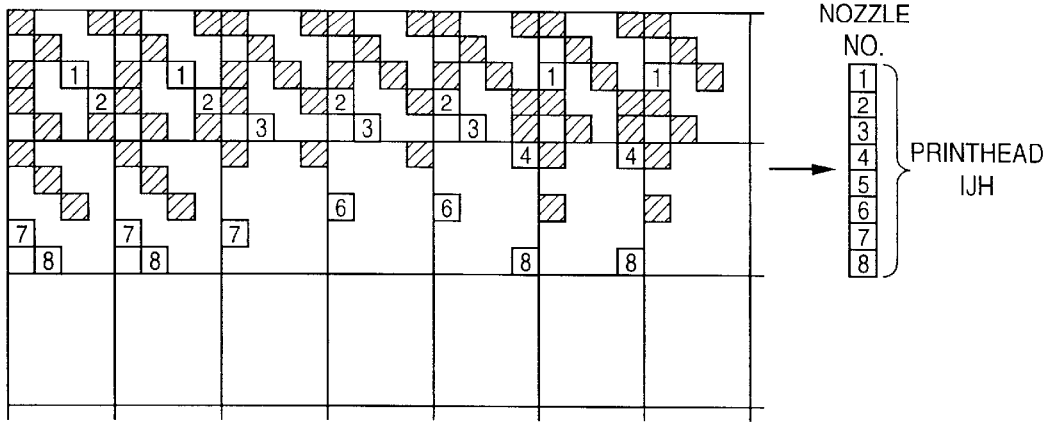

Next, at step S80, the printing paper is subjected to a line feed of two lines, then, at step S90, lines 3 to 10 are printed using nozzles 1–8 of the printhead, as shown in FIG. 5E, by the fifth scan of the printhead. As a result, the printing (four-pass printing) of the next two lines, namely lines 3 and 4, is completed. Lines 3 and 4 of the dither matrix of 4×5 dots and lines 3 and 4 of the matrices of the mask patterns of 9×8 dots are used in the printing of the area in which printing of the image is thus completed.

Figure 5F:
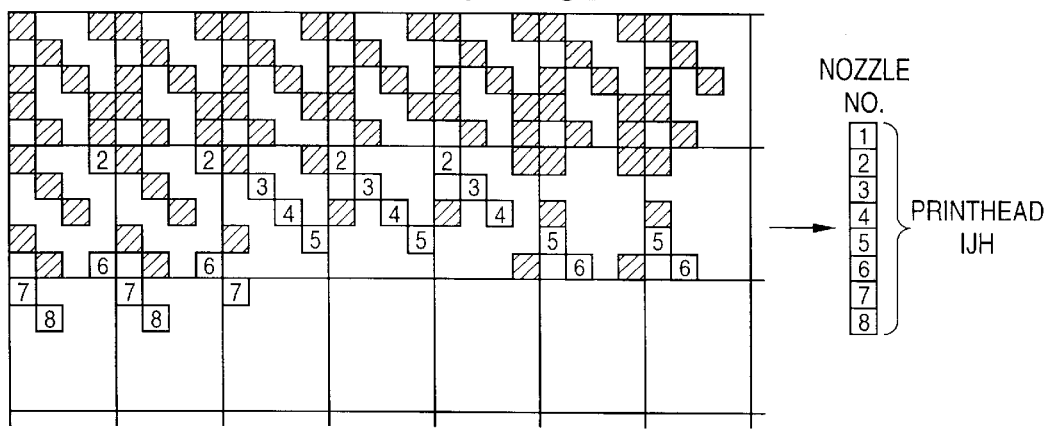

Next, at step S100, the printing paper is subjected to a line feed of two lines, then, at step S110, lines 5 to 12 are printed using nozzles 1–8 of the printhead, as shown in FIG. 5F, by the sixth scan of the printhead. As a result, the printing (four-pass printing) of the next two lines, namely lines 5 and 6, is completed. Lines 5 and 1 of the dither matrix of 4×5 dots and lines 5 and 6 of the matrices of the mask patterns of 9×8 dots are used in the printing of the area in which printing of the image is thus completed.

Figure 5G:
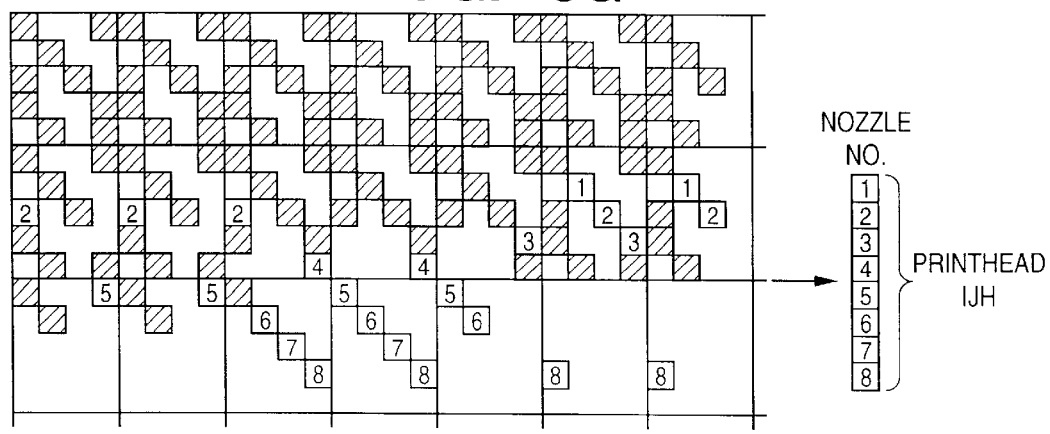

Next, at step S120, the printing paper is subjected to a line feed of two lines, then, at step S130, lines 7 to 14 are printed using nozzles 1–8 of the printhead, as shown in FIG. 5G, by the seventh scan of the printhead. As a result, the printing (four-pass printing) of the next two lines, namely lines 7 and 8, is completed. Lines 2 and 3 of the dither matrix of 4×5 dots and lines 7 and 8 of the matrices of the mask patterns of 9×8 dots are used in the printing of the area in which printing of the image is thus completed.

Next, at step S140, the printing paper is subjected to a line feed of two lines, then, at step S150, lines 9 to 16 are printed using nozzles 1–8 of the printhead by the eighth scan of the printhead. As a result, the printing (four-pass printing) of the next two lines, namely lines 9 and 10, is completed. Lines 4 and 5 of the dither matrix of 4×5 dots and lines 1 and 2 of the matrices of the mask patterns of 9×8 dots are used in the printing of the area in which printing of the image is thus completed.

Processing then proceeds to step S160, where the printing paper is subjected to a line feed of two lines, and the above-described processing is repeated to advance the printing of the image.

FIG. 7 is a diagram showing the result of printing a binarized image obtained by the above-described processing. FIG. 7 shows which nozzles of the printhead IJH performed printing (discharged ink) in regard to each of the pixels of columns 1 to 27 per each of lines 1 to 10. The numerical values indicated at the pixels in FIG. 7 represent the numbers of the nozzles that performed printing.

As shown in FIG. 7, nozzles 1, 3, 5 and 7 were used to print the first line from column 1 to column 27, by way of example. How frequently each nozzle is used to discharge ink on line 1 is four times for nozzle 1, two times for nozzle 3, four times for nozzle 5 and three times for nozzle 7. The first line is such that nozzles having even numbers are not used in printing because of the amount of line feed. Accordingly, taking note of the distribution of use of the odd-numbered nozzles, it will be appreciated that all nozzles that are usable can be used substantially evenly.

Similarly, taking note of the distribution of use of nozzles in the printing of the second line from columns 1 to 27, it will be understood that nozzle 2 is used three times, nozzle 6 two times and nozzle 8 two times. Though only three nozzles are used, nozzle 4 also will be used if the number of columns is increased. Furthermore, nozzles used are distributed in a similar manner in regard to the printing of lines from the third line onward, and a specific nozzle is never assigned to the printing of one line.

Thus, in accordance with the embodiment described above, when image data that has been binarized by dithering is printed by multi-pass printing, control of printing is carried out in such a manner that the periodicity of the dither matrix used will not be a whole-number multiple of the periodicity of the matrix of the mask patterns. (In the illustrated embodiment, the relationship between the periodicities is 4:9 in the main-scan direction and 5:8 in the sub-scan direction.) As a result, there is no common divisor between 4 and 9 and between 5 and 8, and it is therefore possible to avoid a condition in which the printing of an entire line is performed by a specific nozzle. Even if the amount of ink discharged from a specific nozzle differs from that of other nozzles, it is possible to prevent the ink discharged from this nozzle from being concentrated on a specific line and, hence, the effects caused by the discrepancy in amount of ink can be dispersed. Consequently, the original goal of multi-pass printing is attained and a high-quality image can be printed.

In the embodiment described above, the number of nozzles possessed by the printhead is eight, the size of the dither matrix is 4×5, and the size of the matrix of the mask patterns for multi-pass printing is 9×8. However, the present invention is not limited to such an arrangement.

More specifically, the size of such matrices is not limited to the above-mentioned arrangement. At least one of the relationship between the size of the matrix of the mask patterns in the main-scan direction and that of the dither matrix in the main-scan direction, and the relationship between the size of the matrix of the mask patterns in the sub-scan direction and that of the dither matrix in the sub-scan direction may be relatively prime. For example, in a case where the size of the dither matrix is 4×5, and the size of the matrix of the mask patterns for multi-pass printing is 9×10, since the ratio of the sizes of these matrices in the main-scan direction is 4:9, the relationship between the sizes of these matrices in the main-scan direction is relatively prime. Thus, printing all dots in one line by a specific nozzle can be prevented.

Further, the above-mentioned embodiment employs a dither method as a binarization method for binarizing multi-valued image data. However, this invention is not limited to this. For example, a density pattern method may be employed as a binarization method. In this case, the relationship between the period of the density pattern matrix and that of the matrix of the mask patterns for multi-pass printing may be relatively prime.

In other words, the relationship between the period of a matrix pattern, which is used for representing pseudo-half-toning based on multi-valued image data, and that of the matrix of the mask patterns for multi-pass printing may be relatively prime.

Further, a droplet discharged from the printhead is explained as an ink droplet, and liquid stored in the ink tank is explained as ink in the above embodiment, however, the present invention is not limited to ink. For example, processed liquid to be discharged toward a printing medium for improving stability, water-resistance, and quality of an image may be stored in the ink tank.

The above-described embodiment has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type printing apparatus and a continuous type printing apparatus. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat Nos. 4,558, 333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, not only an exchangeable chip type printhead, as described in the above embodiment, which can be electrically connected to the apparatus main unit and can receive an ink from the apparatus main unit upon being mounted on the apparatus main unit but also a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

The present invention can be applied to a system constituted by a plurality of devices (e.g., host computer, interface, reader, printer) or to an apparatus comprising a single device (e.g., copying machine, facsimile machine). Furthermore, it goes without saying that the invention is applicable also to a case where the object of the present invention can be achieved by supplying a memory medium which stores program codes for realizing the functions of the aforesaid embodiment to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for supplying the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus for printing an image on a print medium using a pattern used for representing half tone, comprising:
    a printhead having a plurality of printing elements; and
    print control means for scanning a different printing element in the plurality of printing elements of said printhead on the same area of the print medium plural times and performing complementary printing using the pattern used for representing half tone and a mask pattern by the plural times of scans of said printhead;
    wherein the relationship between a period of a matrix of the pattern used for representing half tone and that of a matrix of the mask pattern is relatively prime.

2. The apparatus according to claim 1, wherein said print control means includes thinning out means for complementarily thinning out the pattern used for representing half tone by using the mask pattern.

3. The apparatus according to claim 1, wherein, when a size of the matrix of the pattern used for representing half tone is N1×M1, and that of the matrix of the mask pattern is N2×M2, at least one of the relationship between N1 and N2, and the relationship between M1 and M2 is relatively prime.

4. The apparatus according to claim 3, wherein the relationship between N1 and N2 is relatively prime, and the relationship between M1 and M2 is relatively prime.

5. The apparatus according to claim 4, wherein N1 and N2 are sizes with respect to a scanning direction of said printhead, while M1 and M2 are sizes with respect to a direction in which the print medium is conveyed.

6. The apparatus according to claim 1, further comprising conversion means for inputting multi-valued image data and outputting a pattern representing half tone.

7. The apparatus according to claim 6, wherein said conversion means outputs the pattern representing half tone by binarizing the multi-valued image data by using a dither matrix.

8. The apparatus according to claim 6, wherein said conversion means outputs the pattern representing half tone by binarizing the multi-valued image data by using a density pattern.

9. The apparatus according to claim 1, further comprising memory means for storing the pattern used for representing half tone and the matrix of the mask pattern.

10. The apparatus according to claim 1, wherein said printhead has a plurality of ink discharge nozzles for discharging ink as the plurality of printing elements.

11. The apparatus according to claim 10, wherein said printhead discharges the ink by utilizing thermal energy.

12. A printing method for printing an image on a print medium using a pattern used for representing half tone, comprising the steps of:
    scanning a different printing element in a plurality of printing elements included in a printhead on the same area of the print medium plural times; and
    controlling to perform complementary printing using the pattern used for representing half tone and a mask pattern by the plural times of scans of said printhead,
    wherein the relationship between a period of a matrix of the pattern used for representing half tone and that of a matrix of the mask pattern is relatively prime.

13. The method according to claim 12, wherein said controlling step includes a step of complementarily thinning out the pattern used for representing half tone by using the mask pattern.

14. The method according to claim 12, wherein, when a size of the matrix of the pattern used for representing half tone is N1×M1, and that of the matrix of the mask pattern is N2×M2, at least one of the relationship between N1 and N2, and the relationship between M1 and M2 is relatively prime.

15. The method according to claim 14, wherein the relationship between N1 and N2 is relatively prime, and the relationship between M1 and M2 is relatively prime.

16. The method according to claim 15, wherein N1 and N2 are sizes with respect to a scanning direction of said printhead, while M1 and M2 are sizes with respect to a direction in which the print medium is conveyed.

17. The method according to claim 12, further comprising a conversion step of inputting multi-valued image data and outputting a pattern representing half tone.

18. The method according to claim 17, wherein said conversion step outputs the pattern representing half tone by binarizing the multi-valued image data by using a dither matrix.

19. The method according to claim 17, wherein said conversion step outputs the pattern representing half tone by binarizing the multi-valued image data by using a density pattern.

* * * * *

UNITED STATES PATENT AND TRADEMARK OFFICE
CERTIFICATE OF CORRECTION

PATENT NO. : 6,409,299 B1
DATED : June 25, 2002
INVENTOR(S) : Aihara

It is certified that error appears in the above-identified patent and that said Letters Patent is hereby corrected as shown below:

<u>Title page,</u>
Item [56], References Cited, add -- OTHER PUBLICATIONS --; and under OTHER PUBLICATIONS, add -- Stoffell, J.C. et al., "A Survey Of Electronic Techniques For Pictorial Image Reproduction", IEEE Transactions on Communications, U.S. IEEE, New York, Vol. 29, No. 12, December 1981, pages 1898-1925. --

<u>Column 2,</u>
Line 62, "in the" should read -- the --.

<u>Column 4,</u>
Line 38, "proceeds.;" should read -- proceeds; --.

<u>Column 7,</u>
Line 3, "SG" should read -- 5G --.

<u>Column 9,</u>
Line 6, "the_sizes" should read -- the sizes --; and
Line 42, "so-called an" should read -- a so-called --.

<u>Column 11,</u>
Line 26, "besides" should read -- besides the --; and
Line 27, "are" should read -- that are --.

Signed and Sealed this

Twenty-fifth Day of March, 2003

JAMES E. ROGAN
*Director of the United States Patent and Trademark Office*